(12) United States Patent
Muto et al.

(10) Patent No.: US 6,887,539 B2
(45) Date of Patent: May 3, 2005

(54) POLYETHYLENE HEAT SHRINKABLE TUBE

(75) Inventors: Koji Muto, Osaka (JP); Taro Fujita, Osaka (JP); Shinya Nishikawa, Osaka (JP); Hiroshi Hayami, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 27 days.

(21) Appl. No.: 10/196,294

(22) Filed: Jul. 17, 2002

(65) Prior Publication Data

US 2003/0026926 A1 Feb. 6, 2003

(30) Foreign Application Priority Data

Jul. 17, 2001 (JP) ........................................ 2001-216380

(51) Int. Cl.[7] .............................. B65B 53/02; B32B 1/08
(52) U.S. Cl. .................... 428/34.9; 428/35.1; 428/36.9; 428/36.92
(58) Field of Search .............................. 428/34.9, 35.1, 428/36.9, 36.92

(56) References Cited

U.S. PATENT DOCUMENTS

| | | | |
|---|---|---|---|
| 3,592,881 A | 7/1971 | Ostapchenko | 260/897 |
| 3,975,039 A | 8/1976 | Penneck et al. | 285/156 |
| 4,427,725 A * | 1/1984 | Crofts | 428/34.9 |
| 4,576,871 A | 3/1986 | Oestreich | 428/521 |
| 4,576,993 A | 3/1986 | Tamplin et al. | 525/240 |
| 5,110,638 A * | 5/1992 | Vogdes et al. | 428/35.1 |
| 5,250,332 A | 10/1993 | Kupczyk et al. | 428/34.9 |
| 5,324,372 A * | 6/1994 | Chiotis | 156/84 |
| 6,060,137 A * | 5/2000 | Akao | 428/35.2 |

FOREIGN PATENT DOCUMENTS

| | | |
|---|---|---|
| JP | 4-252246 A | 9/1992 |
| JP | 9-95563 A | 4/1997 |
| JP | P2000-186158 A | 7/2000 |

OTHER PUBLICATIONS

Fred Billmeyer, Jr., Textbook of Polymer Science, 1984, John Wiley & Sons, third edition, pp. 364–365.*

* cited by examiner

*Primary Examiner*—Harold Pyon
*Assistant Examiner*—Chris Bruenjes
(74) *Attorney, Agent, or Firm*—McDermott Will & Emery LLP

(57) ABSTRACT

The present invention improves the concentricity after expansion process of a heat shrinkable tube which is required to have a thin wall and hardness, and further aims to obtain elongation of 100% or more in a heat aging test, copper stability test, and heat shock test. The heat shrinkable tube satisfying such aim uses a medium- or high-density polyethylene that has a molecular weight distribution (Mw/Mn) of 30 to 55, an MFR of 0.05 to 0.2, and a specific gravity of 0.94 to 0.96. A medium- or high-density polyethylene obtained by combining an ethylene-vinyl acetate copolymer, ethylene-ethylacrylate copolymer, ethylene-methylacrylate copolymer, and ethylene-ethylmethacrylate copolymer may be used. More preferably, for an antioxidant, phenol-based and sulfur-based antioxidants are used together and zinc oxide is added.

2 Claims, No Drawings

POLYETHYLENE HEAT SHRINKABLE TUBE

FIELD OF THE INVENTION

The present invention relates to a polyethylene heat shrinkable tube suitable for use as an insulating cover of a capacitor, and the like.

BACKGROUND ART

A heat shrinkable tube made from a polyolefin containing a polyethylene is normally produced by the following method.

That is, first, a polyolefin is molded into a tube by means of extrusion, and crosslinking is carried out by means of electron beam irradiation, and then, the tube is heated to a temperature equal to or higher than the softening point of polyolefin. The tube is expanded in this condition and cooled in this expanded condition.

The process in which a tube is heated to a temperature equal to or higher than the softening point of the polyolefin, expanded in the heated condition, and then cooled in the expanded condition is referred to as an expansion process, and in this expansion process, poor concentricity in which the tube thickness is not uniform may occur.

In a case of a thick tube or a tube using a polyolefin with a low degree of crystallinity, poor concentricity does not easily occur, however; in a case where a polyethylene with a high degree of crystallinity is used to form a thin tube, poor concentricity easily occurs.

In a case of a heat shrinkable tube for insulating cover of a capacitor, improvement in wear resistance and improvement in insertability of a covering object into the tube are desirable. In order to improve these, use of a medium-or high-density polyethylene with a high degree of crystallinity, and the like, is preferable.

However, in this case, poor concentricity easily occurs as described above, and the permissible poorest concentricity is considered as follows.

For example, when a marking is printed with a marking roll pressed against a flattened tubing, the tubing must be sufficiently flat so that the marking may be printed well. It is known that such printing can be carried out without problems if the concentricity is 25% or less, where the concentricity=(maximum wall thickness−minimum wall thickness)÷maximum wall thickness×100.

Furthermore, in a case of a heat shrinkable tube for insulating cover on a capacitor, it is required to reduce the wall thickness; however, the smaller the wall thickness, the more easily thermal deterioration occurs. Therefore, it is difficult to satisfy a heat aging test, copper stability test, and heat shock test that are necessary to obtain UL certification.

SUMMARY OF THE INVENTION

An object of the present invention is to provide a polyethylene heat shrinkable tube with a small wall thickness and a concentricity of 25% or less by using a medium- or high-density polyethylene with a high degree of crystallinity, preferably, a polyethylene heat shrinkable tube that satisfies UL's heat aging test, copper stability test, and heat shock test.

A polyethylene heat shrinkable tube according to the invention is typically formed from a polyolefin resin composition which contains, as a base polyolefin resin, 60% or more by weight of a medium- or high-density polyethylene having molecular weight distribution (Mw)/(Mn) of 30–55, melt flow rate (MFR) of 0.05–0.2, and specific gravity of 0.94–0.96. Here Mw represents weight average molecular weight, and Mn represents numbers-average molecular weight. Preferably, the polyolefin resin composition contains a phenol-based antioxidant, sulfur-based antioxidant, and zinc oxide.

BEST MODE FOR CARRYING OUT THE INVENTION

In a case of a heat shrinkable tube for insulating cover of a capacitor, there is a requirement for improvement in wear resistance and improvement in insertability of a covering object into the tube. The object of the invention is to provide a heat shrinkable tube for insulating cover on a capacitor or the like, and in order to satisfy the abovementioned requirement, a medium- or high-density polyethylene with a specific gravity of 0.94–0.96 is used as a main base polymer.

However, as mentioned above, in a case where a heat shrinkable tube whose wall thickness is small is produced by using a polyethylene with a high degree of crystallinity, poor concentricity easily occurs in the expansion process.

The inventors of the present invention investigated the causes of the poor concentricity and examined a method for preventing poor concentricity.

As a result, the following was evaluated as a cause of poor concentricity.

In a case of a polyethylene with a high degree of crystallinity, when a disturbance such as cooling partially influences the expansion process, a portion with a high degree of crystallinity and a portion with a low degree of crystallinity are easily generated. When the degree of crystallinity differs, a difference arises in expandability, and only a portion that can easily be expanded is expanded, resulting in poor concentricity.

Therefore, it is estimated that poor concentricity can be prevented by preventing the occurrence of differences in expandability even when the degree of crystallinity differs.

As a means of achieving this, the use of a material whose melt elongation is great was considered in order to reduce the degree of the effect of crystallinity on the expandability.

As a result of further examination, it was found that since a polyethylene with a great molecular weight distribution (Mw/Mn) had high melt elongation, the influence of the crystallinity on the expandability could be reduced, and hence the use of a polyethylene with a molecular weight distribution of 30–55 as a main base polymer was especially preferable. This polyethylene may be composed of one kind of polyethylene having a large molecular weight distribution or may be obtained by mixing a plurality of kinds of polyethylene having different molecular weight distributions. If the proportion of the abovementioned polyethylene in the base polymer is small, the effect cannot be obtained, so the proportion is preferably 60% or more.

Of course, in the abovementioned case, the proportion of polyethylene being 100% is also preferable.

Furthermore, as a polyolefin composing the portion other than the abovementioned polyethylene, any of an ethylene-vinyl acetate copolymer, ethylene-ethylacrylate copolymer (EA), ethylene-methylacrylate copolymer, ethylene-methylmethacrylate copolymer, low-density polyethylene, linear low-density polyethylene, medium- or high-density polyethylene, and ionomer can be applied, and among these, an ethylene-vinyl acetate copolymer, ethylene-ethylacrylate copolymer, ethylene-methylacrylate copolymer, and ethylene-methylmethacrylate copolymer are preferable.

To satisfy the UL's heat aging test, copper stability test, and heat shock test, the addition of an antioxidant to the polyethylene is essential.

In addition, based on the examination by the present inventors, it was found that the use of a phenol-based antioxidant and sulfur-based antioxidant together and addition of zinc oxide are necessary.

As preferable addition amounts, each antioxidant is added by 2–4 PHR, and zinc oxide is added by 3–10 PHR.

Furthermore, it was found that, in the case of a medium- or high-density polyethylene with a high MFR, even if a phenol-based antioxidant an a sulfur-based antioxidant were used together and zinc oxide was added, it was not possible to satisfy the copper stability test and heat shock test, so a medium- or high-density polyethylene with an MFR of 0.05 to 0.2 was preferable for the heat shrinkable tube of the invention.

EXAMPLES

The invention is explained in detail by using examples and comparative examples.

By using the compositions shown in Table I, tubes with an inside diameter of 3.5 mm and a wall thickness of 0.2 mm were manufactured with an extruder. Next, these tubes were subjected to electron beam irradiation was carried out with a radiation dose of 240 kGy, and finally, the crosslinked tubes were continuously passed through a 150° C. air tank so as to be heated to the softening point temperature or higher, and then immediately fed into a sizing die with an inside diameter of 7.5 mm whose interior was decompressed, and hence they were expanded to an approximately twice as large diameter. The sizing die was cooled to 5° C. in advance, and tubes that came into contact with the die were cooled in their expanded state.

The concentricity is shown in the last column of Table I.

As shown by the results, a concentricity was 25% or more in Comparative examples 1 and 2 in which the molecular weight distribution (Mw/Mn) of polyethylene used as the main components was 7 and 20, respectively, while in Example 1 where polyethylene having a molecular weight distribution (Mw/Mn) of 52 was used, a preferable concentricity of 18% was obtained.

TABLE I

|  | Example 1 | Comparative example 1 | Comparative example 2 |
|---|---|---|---|
| PE trial - manufactured by Japan Polyolefins Co., Ltd. *1 | 70 |  |  |
| J-REX KB148A *2 |  | 70 |  |
| HI-ZEX 5305E *3 |  |  | 70 |
| NUC6170 *4 | 30 | 30 | 30 |
| Concentricity (%) | 18 | 30 | 28 |

*1: (Made by Japan Polyolefins Co., Polyethylene Ltd.)
   Mw/Mn  52   MFR  0.09   Specific gravity  0.942
*2: (Japan Polyolefins Co., Ltd. Polyethylene Trademark)
   Mw/Mn  7    MFR  0.3    Specific gravity  0.944
*3: (Mitsui Chemicals, Inc. Polyethylene Trademark)
   Mw/Mn  20   MFR  0.8    Specific gravity  0.953

TABLE I-continued

|  | Example 1 | Comparative example 1 | Comparative example 2 |
|---|---|---|---|
| *4: (NUC Trademark) |  | Ethylene copolymer | ethylacrylate |
| EA 18% | MFR | 5.7 | Specific gravity 0.932 |

By using the compositions shown in Table II, tubes with an inside diameter of 3.5 mm and a wall thickness of 0.2 mm were manufactured with an extruder. These tubes were subjected to electron beam irradiation with a radiation dose of 240 kGy onto, and the crosslinked tubes were continuously passed through a 150° C. air tank so as to be heated to the softening point temperature or higher, and then immediately fed into a sizing die with an inside diameter of 7.5 mm whose interior was decompressed, and hence they were expanded to approximately 2 times the initial diameter. The sizing die was cooled to 5° C. in advance, and tubes that came into contact with the die were cooled while maintaining the expanded condition.

The concentricity of each heat shrinkable tube of Examples 2 through 4 thus obtained was preferable, 15 to 17% as shown in Table 2; however, the concentricity of Comparative example 3 was not preferable, 26%.

The heat aging test, copper stability test, and heat shock test were conducted for these heat shrinkable tubes under the following conditions. Heat aging test: A tube that was completely restored to its original shape by being heated to 150° C. was left for 168 hours in a 158° C. constant temperature bath. Subsequently, after being taken out of the bath, the tube was measured with a tensile tester in terms of the tensile strength and elongation at fracture. Copper stability test: A tube is heated to 150° C. with a copper bar inserted therein and thereby the copper bar was adhered to the inner surface of the tube. Then, the tube was left for 24 hours in an atmosphere of a temperature of 23° C. and a relative humidity of 95% RH, and then left for 168 hours in a 158° C. constant temperature bath. Subsequently, after the tube was taken out of the bath, its tensile strength and elongation at fracture were measured with a tensile tester. Heat shock test: A tube that was completely restored to its original shape by being heated to 150° C. was left for four hours in a 250° C. constant temperature bath. Subsequently, after taken out of the bath, the tube was measured with a tensile tester in terms of the elongation at fracture. (According to UL standards, the decision of acceptance or rejection is made based on the occurrence of a crack when the tube is wound around a bar having almost the same diameter as that of the tube; however, herein, the decision of acceptance or rejection was made based on whether the elongation was 100% or larger.)

In the abovementioned tests, conditions for the tension test were set so that the distance of bench marks of the sample was 25 mm, the chuck interval was 50 mm, and the speed of testing was 50 mm/min.

TABLE 2

|  | Example 2 | Example 3 | Example 4 | Comparative example 3 |
|---|---|---|---|---|
| PE trial - manufactured by Japan Polyolefins Co., Ltd. *5 | 70 | 70 | 70 |  |
| HI-ZEX 5305E *6 |  |  |  | 70 |

TABLE 2-continued

|   | Example 2 | Example 3 | Example 4 | Comparative example 3 |
|---|---|---|---|---|
| NUC 6100 *7 | 30 | 30 | 30 | 30 |
| Sumilizer MB *8 | 2 | 2 |   | 2 |
| Irganox 1010 *9 | 3 | 3 | 3 | 3 |
| Stabinol CS42 *10 |   |   | 2 |   |
| Zinc oxide | 5 |   | 5 | 5 |
| Concentricity (%) | 17 | 16 | 15 | 26 |
| Elongation (%) Early stage | 360 | 370 | 360 | 300 |
| After aging | 320 | 250 | 260 | 280 |
| Copper stability | 310 | 80 | 260 | 20 |
| Heat shock | 150 | 60 | 70 | 50 |

| *5: | (Made by Japan Polyolefins Co., Ltd.) | Polyethylene | | | |
| | Mw/Mn | 52 | MFR | 0.09 | Specific gravity | 0.942 |
| *6: | (Mitsui Chemicals, Inc. Trademark) | Polyethylene | | | |
| | Mw/Mn | 20 | MFR | 0.8 | Specific gravity | 0.953 |
| *7: | (Made by NUC) | Ethylene copolymer | | | ethylacrylate |
| | EA 18% | | MFR | 5.7 | Specific gravity | 0.932 |
| *8: | Sulfur-based antioxidant |
| *9: | Phenol-based antioxidant |
| *10: | Amine-based antioxidant |

The results of the heat aging test, copper stability test, and heat shock test are shown in the bottom column of Table 2.

Example 3 in which zinc oxide was not added was defective since the elongation did not reach 100% in both the copper stability test and heat shock test.

Example 4 in which an amine-based antioxidant was added in place of the sulfur-based antioxidant was defective since the elongation did not reach 100% in the heat shock test.

Comparative Example 3 in which the phenol-based antioxidant, sulfur-based antioxidant, and zinc oxide were all added and a base polymer high-density polyethylene with a high MFR was defective since the elongation did not reach 100% in both the copper stability test and heat shock test.

Example 2 in which a high-density polyethylene with a low MFR was used as a base polymer and a phenol-based antioxidant, sulfur-based antioxidant, and zinc oxide were added was preferable since the elongation reached 100% or more in all of the heat aging, copper stability, and heat shock tests.

Industrial Applicability

As described above, by using a medium- or high-density polyethylene according to the invention, a tube with excellent concentricity can be obtained. Furthermore, by using phenol-based and sulfur-based antioxidants together and adding zinc oxide, even in the case of a small wall thickness, elongation of 100% or more can be obtained in the heat aging test, copper stability test, and heat shock test.

What is claimed is:

1. A heat shrinkable tube formed of a polyolefin resin composition, wherein said polyolefin resin composition comprises:

(A) 60% or more of middle to high density polyethylene defined in the following ranges:
   (a) molecular weight distribution (Mw/MN) of 30–55, wherein Mw represents weight-average molecular weight and MN represents number-average molecular weight;
   (b) melt flow rate (MFR) of 0.05 to 0.2; and
   (c) specific gravity of 0.94 to 0.96;

(B) phenol resin-based antioxidant, (C) sulfur-based antioxidant, and (D) zinc oxide, and, said polyolefin resin composition is formed into a tube, then, cross-linked by irradiation by an electron beam, and the tube is expanded in diameter at temperatures of not lower than softening point, said expanded tube having a concentricity of 25% or less, where the concentricity is equal to (maximum wall thickness–minimum wall thickness)/maximun wall thickness× 100.

2. The heat shrinkable tube according to claim 1, wherein 2 to 4 parts by weight of a phenol-based antioxidant, 2 to 4 parts by weight of a sulfur-based antioxidant, and 3 to 10 parts by weight of zinc oxide are contained based on 100 parts by weight of resin in the polyolefin resin composition.

* * * * *